Figure 1:
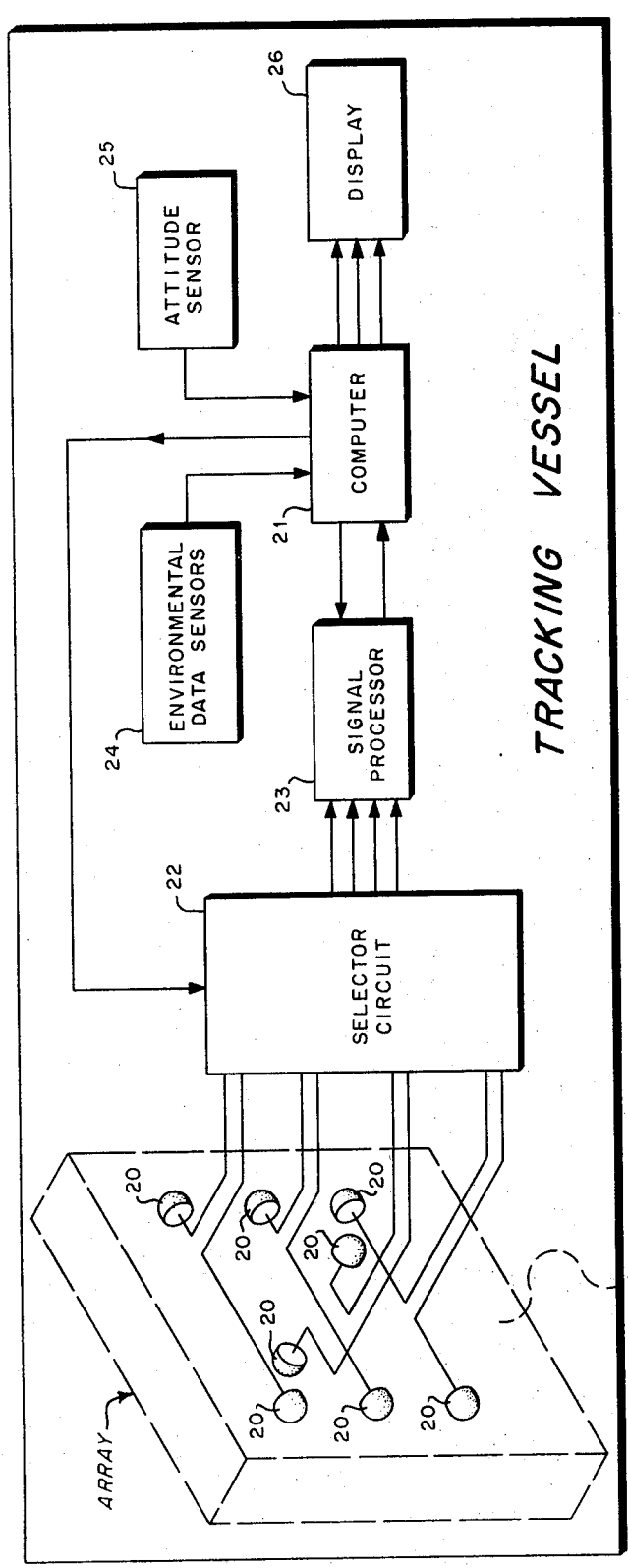
Figure 1:
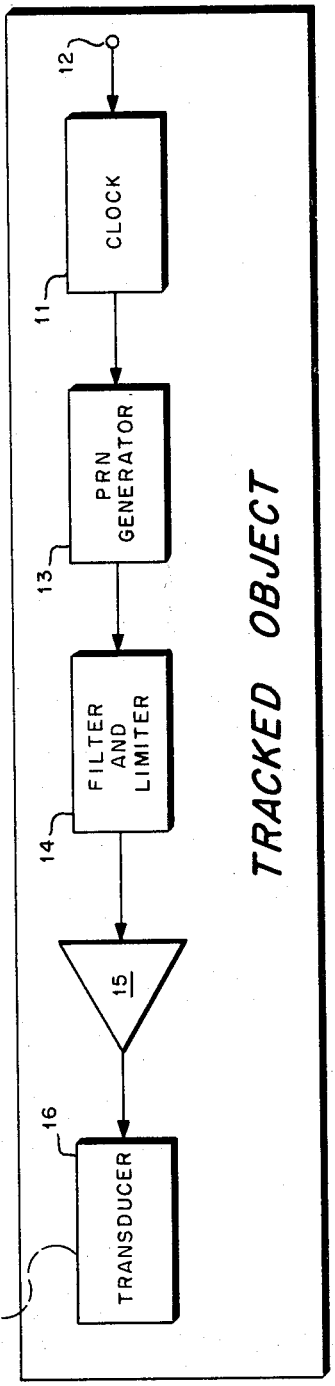

United States Patent [19]

Seeley, Jr. et al.

[11] 3,764,964

[45] Oct. 9, 1973

[54] UNDERWATER TRACKING SYSTEM

[75] Inventors: Ralph M. Seeley, Jr., Port Matilda; Francis P. Finlon, State College, both of Pa.

[73] Assignee: The United States of America as represented by the Secretary of the Navy, Washington, D.C.

[22] Filed: Jan. 20, 1967

[21] Appl. No.: 615,038

[52] U.S. Cl. .......................... 340/6 R, 343/112 CL
[51] Int. Cl. ......................... G01s 5/18, G01s 3/80
[58] Field of Search .................. 340/3 T, 6 R, 16 R; 343/100 CL, 113

[56] References Cited
UNITED STATES PATENTS

| 3,171,126 | 2/1965 | Wiley | 343/100 CL X |
| 3,205,475 | 9/1965 | Foss | 340/6 R |
| 3,337,870 | 8/1967 | Allen et al. | 343/100 CL X |

OTHER PUBLICATIONS

Allen et al., "J. Acous. Soc. Amer.," Jan. 1964, pp. 124–127
Laing et al., "IEEE Trans. Sonics and Ultrasonics," June 1965, pp. 26–30

*Primary Examiner*—Richard A. Farley
*Attorney*—G. J. Rubens and Henry Hansen

[57] ABSTRACT

The apparatus disclosed herein is a submarine based tracking system for tracking one or more independently movable underwater objects each equipped with system synchronized apparatus for transmitting underwater a PRN (pseudo random noise) signal characteristic of that particular object. The submarine is equipped with an array of precisely located hydrophones for sensing the PRN signals, a signal processor, a computer, and a display. The computer is programmed to direct the outputs of both a pair of selected vertically spaced hydrophones and a pair of selected horizontally spaced hydrophones to the signal processor which, in turn, provides to the computer signals indicative of the relative times of reception by the selected hydrophones of the PRN signal emanating from the tracked object. The computer utilizes the aboveindicated reception time indicia to ascertain and provide to the display signals indicative of the spherical coordinates of the location of the tracked object relative to the submarine. The signal processor is described in more detail as including reference signal generators providing a number of PRN signals each similar to that transmitted from the object and differing therefrom by a respective anticipated Doppler shift which would occur within an expected range of closing velocities. The processor further includes circuitry for down shifting the center frequencies of each of the received signals and each of the reference signals. Digital serial cross correlators are provided to obtain a band-pass correlation function for each of the received and reference signal combinations. The processor also includes circuitry for shifting the center frequencies of the carriers of the band-pass correlation functions upwardly to the level of the center frequencies of the hydrophone sensed PRN signals and circuitry for obtaining therefrom the reception time indicia indicated above as being provided to the computer.

9 Claims, 2 Drawing Figures

INVENTORS
RALPH M. SEELEY, JR.
FRANCIS P. FINLON

BY

ATTORNEY

INVENTORS
RALPH M. SEELEY, JR
FRANCIS P. FINLON

ATTORNEY

UNDERWATER TRACKING SYSTEM

There are significant problems involved in utilizing a tracking signal emanating from remote underwater objects. More precise location of the arrival time of a signal is enabled by sensing the peak of a correlation function rather than by sensing an input signal level which exceeds some arbitrary threshold level. It has been discovered according to the invention that even better time resolution is enabled when a band-pass correlation function, i.e., a product modulation of a carrier frequency and a correlation function, is utilized in that an individual carrier peak may be located more precisely than the peak of the correlation function envelope. Unfortunately, the use of band-pass correlation functions introduces the problem of the ambiguity of choosing between the band-pass correlation function carrier peaks.

There are inherent frequency limitations on underwater signal transmission. If the signal frequency range is too low, considerable noise, primarily contributed to by cavitation, machinery and flow, adversely affects the signal-to-noise ratio. If the frequency range is too high, the absorption coefficient begins to primarily adversely affect the signal-to-noise ratio. Even though a complicated tracking signal such as pseudo random noise (PRN) were to be used so that a lower signal-to-noise ratio is permissible, the above-indicated frequency range limitations enchance ambiguity when digital serial correlators are utilized to obtain the band-pass correlation functions. In order to reduce ambiguity to a satisfactorily minimal level, the ratio of the frequency of sampling the tracking signal to the frequency of the tracking signal should exceed a minimum value. Since commonly used signal sampling frequencies are within an intermediate range and since the machinery noise, cavitation and flow noise limit the lowest permissible significant frequency component of the signal, it has been found that tracking signal frequencies within the range indicated above cause the aforesaid minimal ratio to be impermissibly low.

It is a general purpose of this invention to provide a ship or submarine based tracking system capable of tracking one or more independently movable underwater objects with great precision. Briefly, this is accomplished by providing apparatus for receiving at selected spaced locations on the vessel a characteristic tracking signal from each underwater object to be tracked, by processing the signal as received at each location through digital serial correlation apparatus for generating a respective band-pass correlation function from all of which may be ascertained time differentials between times of reception of the signal at the selected locations, and by computing from the time differentials and range information the spherical coordinates of the tracked objects relative to the vessel. Apparatus is also provided to shift the center frequency of the respective tracking signal downwardly prior to obtaining therefrom a band-pass correlation function by digital correlation with a Dopplerized reference signal. Additional apparatus is provided to shift the center frequency of the carrier of the respective band-pass correlation function upwardly to that of the original tracking signal prior to processing the band-pass correlation function through peak detecting circuitry.

It is, therefore, an object of this invention to provide a time interferometer tracking system which enables the precise location of selected underwater objects.

A further object of this invention is to provide improved tracking signal processing equipment which is operable at lower signal-to-noise ratios than were heretofore considered usable.

A still further object of this invention is to provide a digital tracking system including digital serial correlators and operable with low ambiguity in response to frequencies in the sonar range.

Figure 2:
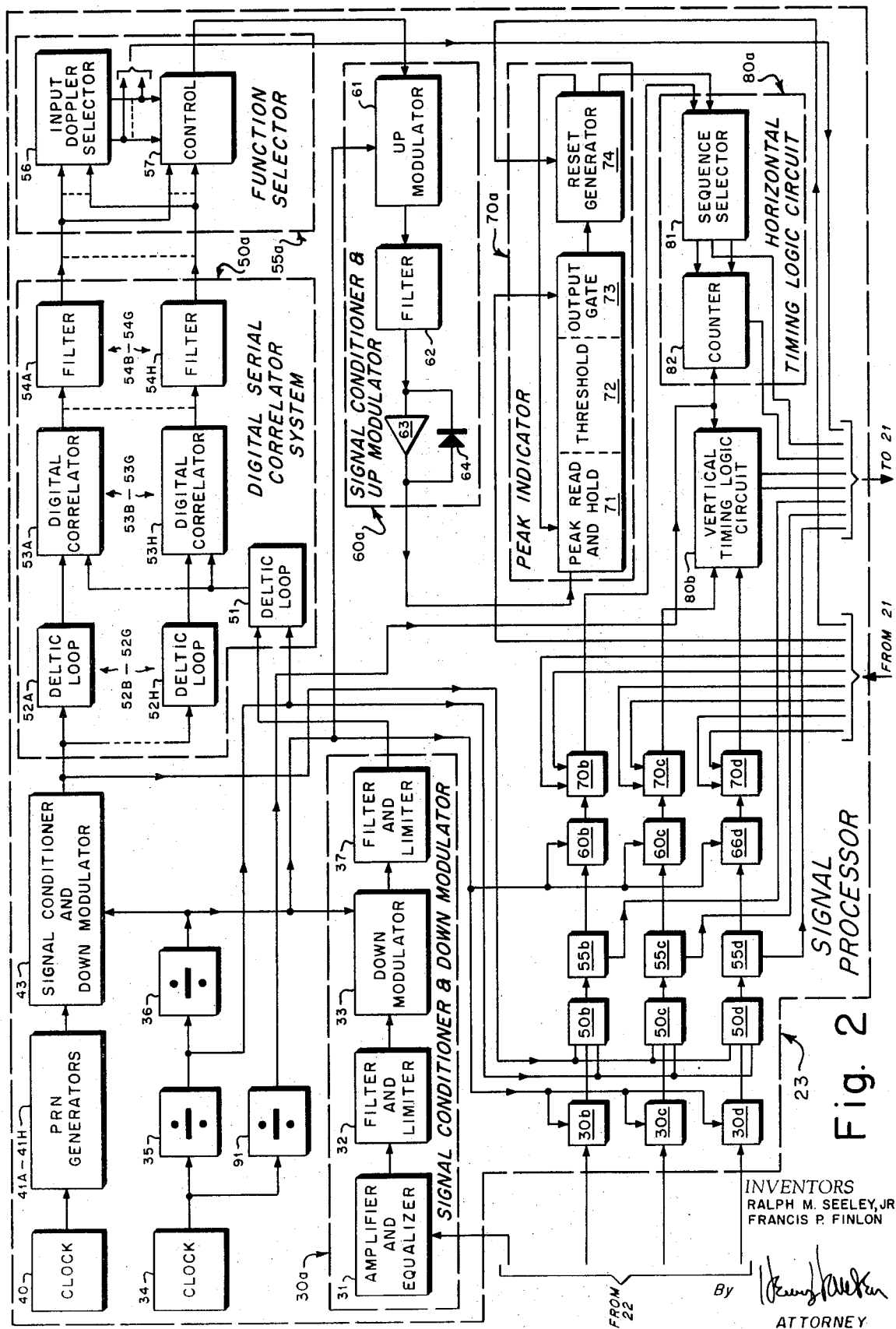

Other objects and advantages of the invention will hereinafter become more fully apparent from the following description of the annexed drawing which illustrates the preferred embodiment and wherein:

FIG. 1 represents a block diagram of a tracking system according to the invention; and FIG. 2 represents a block diagram according to the invention of a signal processor of the tracking system of FIG. 1.

Referring now to the embodiment of FIG. 1 each object to be tracked carries tracking signal transmitting apparatus including a synchronizing clock 11 which is started by a system synchronizing signal fed thereinto as through an input 12. The clock 11 periodically activates a PRN generator 13 whose pulsed PRN output, which is characteristic of that object, is fed through a filter and leveler 14 wherein the PRN signal is appropriately shaped. It is preferred that the product of the PRN pulse duration and the PRN bandwidth be high so that interference and problems in signal processing are minimized. The filtered PRN signal is amplified by a power amplifier 15 and fed to a transducer 16 which transmits the PRN tracking signal through the intervening water toward the submarine, i.e., tracking vessel.

For a large transmitter-receiver separation the cosine of the angle of signal arrival, $\theta$, at two receiving elements spaced apart a distance d, is given by the formula:

$$\cos \theta = c\Delta t/d$$

where $c$ is the speed of signal propagation through the water and $\Delta t$ is the difference in signal arrival times at the two elements. Hence, it appears that by knowing the physical separation between the two hydrophones and by measuring the time differential between the times of reception of the PRN tracking signal, one can ascertain the bearing of the transmitter relative to the hydrophones. Of course, the computation of bearing from time differentials becomes more complex as the transmitter moves closer to the receiver. By obtaining measurements of the range and the bearing of the transmitter-carrying object in two intersecting planes, such as horizontal and vertical, the spherical coordinates of the object to be located may be ascertained.

Referring again to FIG. 1, hydrophones 20, which are arranged in an array and are carried by the tracking submarine, sense the PRN tracking signals which emanate from the objects to be tracked and provide in response thereto corresponding PRN outputs which are to be processed to ascertain time differentials and thereby object bearing. Because of hydrophone response and certain submarine generated noise and also because of several possible orientations of the submarine relative to the objects to be tracked, it is preferred that different pairs of the hydrophones in the array be selected as by a computer in order to find the best indications of signal arrival times from which can be computed horizontal and vertical bearing information. To this end, a computer 21 in accordance with its program selects two pairs of hydrophones respectively vertically oriented and horizontally oriented with respect to the submarine and supplies an appropriate activation signal to hydrophone selection circuitry 22 which is connected to receive all outputs of all the hydrophones 20 in the array. The hydrophone selection circuitry 22 may be fabricated in a manner well known in the art and functions in response to the computer signal to connect four computer selected hydrophones of the array with four corresponding selected channels of a corresponding signal processor 23 for processing the signal from a given object. The signal processor 23, hereinafter more fully described, provides to the computer 21 output signals representative of the magnitudes and directions of the time differentials between the respective arrival times of the given PRN tracking signal at each of the selected vertically oriented pair of hydrophones and between the respective signal arrival times at each of the selected horizontally oriented pair of hydrophones. The computer 21 also receives from environmental data sensors 24 signals representative of the depth of the submarine and the temperature of the water at that depth whereby the computer may ascertain a more correct value for the speed of propagation of the PRN tracking signal through the water which lies between the objects to be tracked and the submarine. In order that the computer may ascertain the range of the respective object to be located by conventional methods not described herein, the respective clock 11 carried by the given object is synchronized with the computer 21 by a suitable signal generated, transmitted and received by conventional apparatus not shown and fed to the clock 11 through input 12. The computer 21 is programmed to compute the spherical coordinates of the given tracked object relative to the submarine and its longitudinal axis from the range and from the vertical and horizontal time differentials ascertained. Body attitude sensors 25 provide the computer with information whereby it may translate the computed coordinates into spherical coordinates referenced to horizontal. The translated spherical coordinates for the object being tracked are fed to a corresponding display 26 such as an XY recorder and associated depth indicator for each object being tracked.

Referring now to FIG. 2 the signal processor 23 for processing the characteristic PRN signal from one object to be tracked will be more particularly described. Each of the four selected hydrophone outputs is fed into a respective identical signal conditioner and down modulator 30a, 30b, 30c, 30d to an amplifier and equalizer 31, as shown with respect to circuit 30a. The amplifier and equalizer 31 compensates for the transducer-hydrophone combination spectral response. The amplified and equalized output thereof is fed through a filter and limiter 32 into a modulator 33 wherein the center frequency of the PRN hydrophone output is translated downwardly to a frequency which enables sampling with minimal ambiguity in the digital serial correlator, hereinafter more fully described. A clock 34, through serially connected frequency dividers 35 and 36, provides the modulator 33 with the requisite frequency for achieving the selected down shifting of the PRN signal center frequency. The modulated output of the modulator 33 is fed through another filter and limiter 37 whose output comprises the output of the circuit 30a.

In order to obtain a usable band-pass correlation function from the correlation of two signals, exact similarity of the signals being correlated is required. Since the object being tracked and the tracking submarine may be moving relative to each other, the frequency of the PRN signal as received will differ from that of the PRN signal as generated by the apparatus in the object to be located. Hence, the signal processor 23 includes apparatus for generating several Dopplerized reference PRN signals.

Referring again to FIG. 2 the clock 40 sequentially activates a number of PRN generators 41A–41H. Each of the generators 41A–41H produces at a slightly different frequency the PRN signal characteristic of the object to be tracked. For example, it has been found that the use of eight such Dopplerized reference PRN signal generators as indicated permits satisfactory correlation over a relative closing velocity range of about plus and minus 100 knots. The outputs of the generators 41A–41H in the sequence directed by the clock 40 are fed to the signal conditioner and down modulator 43 which is essentially identical to the circuit 30a except that the equivalent of the filter 32 in 30a actually includes two filters, one of the type of filter 32, and another of the type of filter 14 in the object PRN signal transmitting apparatus. Of course, the modulator of circuit 43 and the succeeding filter and limiter thereof enable the same down shifting of the center frequency of the PRN signal as is indicated above.

The output signal from circuit 30a is fed into a digital serial correlator system 50a to a deltic loop 51. Deltic (delay-line-time-compression) loops are well known in the art and provide a means for faster correlation. A description of a suitable digital serial correlation system including deltic loops appears in an article by Max Rosenbloom entitled "Using Time-Compression Techniques in Digital Correlation," *Electronics*, McGraw Hill, Mar. 10, 1961, page 191. Similarly, the output signals of the circuits 30b, 30c and 30d are fed to respective deltic loops in the corresponding digital correlator systems 50b, 50c and 50d. Each of the sequentially generated Dopplerized reference PRN signals from the circuit 43 is sequentially fed to a respective one of eight deltic loops 52A–52H, two of which are shown, and also is fed to similar groups of deltic loops, not shown, in the digital correlator systems 50b, 50c and 50d. The stored Dopplerized reference PRN signals are respectively fed from the deltic loops 52A–52H to corresponding ones of eight correlators 53A–53H, two of which are shown, which are each connected to receive the time compressed PRN signal from the deltic loop 51, whereby the PRN signal may be separately correlated with each of the Dopplerized reference PRN signals. Each of the correlators 53A–53H preferably includes an integrate and dump device, such as is described by R. M. Seeley in "Integrate-and-Dump Operator for Serial Correlators," *Electronic Engineering*, September, 1964, p. 601, from which device is provided a respective correlator output comprising a band-pass correlation function reconstructed in analog form. These outputs of the correlators 53A–53H are fed through a respective filter 54A–54H and thereafter fed into a function selector 55a both to a respective threshold device, not shown, in input Doppler selector 56 and also to a respective switch in control unit 57.

The output signals of the devices in selector 56 are each fed to the computer and to a respective one of the switches in the control unit 57; and the device which is directly receiving the filtered correlation function having the highest signal level above a predetermined threshold produces a signal of controlled duration whereby the appropriate switch in control unit 57 is enabled therewith to pass the filtered correlation function which it is receiving. Of course, the computer may be programmed to compare the above-indicated Doppler identifying signal with that present for previous object location computations and provide the control unit with an appropriate switch activating signal in order to reduce the probability of a false alarm.

Thereby, the identical function selectors 55a–55d each compare the instantaneous peaks of the simultaneous filtered outputs of the correlators in the systems 50a–50d fed respectively thereto, choose for its channel the respective correlation function that has the greatest peak above a minimum arbitrary threshold level and hold its respective choice for a known length of time encompassing the peak of the respective analog-reconstructed bandpass correlation function whereby only the respective functions with the greatest peak above the threshold are permitted to be passed from the selectors 55a–55d. The selectors 55a–55d further each provide the computer 21 with a respective indication as to which Dopplerized reference PRN signal was used to provide the best band-pass correlation function.

The chosen band-pass correlation function which bears a known time relation with the corresponding PRN signal arrival time appears as an output of the function selector 55a and is fed into an up modulator and signal conditioner 60a to an up modulator 61. The modulator 61 raises the resultant correlation function carrier frequency to the level of the original tracking PRN signal center frequency before the time measurements are made.

It appears to be a property of modulators that the input phase shift, including the derivative of phase, i.e., delay, is preserved in the output. Since the modulator input and output frequencies are not equal, the time shifts between the input and output corresponding to phase cannot be equal. Thus, the modulator output carrier-function is thought to move under the band-pass correlation function envelope as the input delay, i.e., range, varies. Thus, as range varies, an accuracte measurement of the time differential between signal arrival times at two separated hydrophones would be impossible. It has been discovered that simple up modulation reassociates the phase-delay and group-delay functions correctly and enables accurate measurement of the time differential even though the range of the object tracked may vary.

Alternatively, a plurality of up modulators like 61 can be positioned to receive the filtered correlation functions from each of the filters in each of the systems 50a–50d, replacing the modulators in the conditioners 60a–60d. The output of these up modulators are fed to the appropriate function selectors 55a–55d. While many more up modulators are required for this alternative construction, the input Doppler selectors will be able to function to select the function having the highest peak with a lesser probability of a false alarm.

The up-modulated band-pass correlation function signal is fed as shown in FIG. 2 through a filter 62 to an input of an ampifier 63 having a diode 64 interconnecting its output with its input. Thiy amplifier 63 amplifies and clips off the top half of the function signal to provide the output of circuit 60a. This clipping is desired in that it enables a better discrimination against minor peaks.

The output signal of the up modulation and signal conditioner 60a is fed to a peak indicator 70a and comprises series of pulses occurring at the function signal carrier frequency having relative amplitudes which vary in accordance with the digitally sampled bandpass correlation function. The peak indicator 70a includes a peak read and hold circuit 71 such as a comparator boxcar circuit which receives the output signal from circuitry 60a, a threshold circuit 72 which provides an indication of a selected signal threshold level, an output gate 73 activated for signal passing in response to a signal from the computer 21 and a reset generator 74 through which passes the output from the output gate 73 to a sequence selector circuit 81 in a horizontal timing logic circuit 80a. The peak read and hold circuit 71 samples and holds each succeeding peak value of the input pulse train and compares the held value with the next succeeding peak value. If the next peak value is larger in amplitude, the larger amplitude is held rather than the preceding. When the sensed peak value drops from a value above the threshold level indicated by the circuit 72 to a value below that threshold value, the reset generator 72 produces an output indication which is passed by the output gate 73 if activated. Since the input signal fed to the peak indicator is periodic, the output indication will always occur an arbitrary known amount of time following the peaking of the correlation function of the tracking signal which was received by the hydrophone 20 connected to the processing channel including circuit 30a.

The selected output signal of digital correlator system 50b is similarly fed through a corresponding up modulator and signal conditioner 60b to a corresponding peak indicator circuit 70b which, in turn, provides to the sequence selector 81 in a horizontal timing logic circuit 80a an output indication occurring the same known amount of time after the peaking of the correlation function of the tracking signal which was received by a selected horizontally displaced hydrophone. THe sequence selector 81 provides a signal to an activate terminal of a counter 82 in response to receiving an output indication from either peak indicator 70a or 70b and, further, provides a signal to a deactivate terminal of the counter 82 upon receipt of the later received output indication from the other of the two peak indicators 70a or 70b. A clock frequency from divider 91, which is connected to receive the output frequency of clock 35, is provided to the counter 82 whose output signal is fed to the computer 21. The sequence selector 81 also produces a signal fed to computer 21 that indicates which of the peak indicators 70a or 70b was the first in time to provide an indication signal. Thereby, the computer is provided with indications of the magnitude and direction of the horizontal time differential.

Similarly, the selected outputs of correlator systems 50c and 50d are respectively fed through the up modulation and signal conditioners 60c and 60d to the respective peak indicators 70c and 70d which, in turn, each provide respective indication signals to a vertical timing logic circuit 80b. This logic circuit 80b functions in the same manner as the horizontal timing logic circuit 80a to provide the computer 21 with a counter output signal indicative of the magnitude of the time differential between the times of reception of the PRN signal at the vertically spaced hydrophones 20 and an indication as to which hydrophone received the PRN signal first.

As indicated above, the computer 21 computes the spherical coordinates of the location of the tracked object from the above-indicated time differentials and from the range thereof which may be ascertained as by measuring the time delay between the known time of PRN tracking signal transmission by the apparatus in the tracked object and the arrival time at the submarine. Of course, the above-described tracking apparatus would include a signal processor 23 or equivalent thereof for each object to be tracked, since each object emits its own characteristic PRN tracking signal.

Thereby is provided a system for tracking selected underwater objects which uses tracking signals having frequencies in the sonar range and lower usable signal-to-noise ratios than were heretofore considered usable. Many of the other advantages of the above-described apparatus are now apparent. For example, a better time resolution of signal arrival times is obtained which enables object location with greater precision. Ambiguity of location has been reduced to a low level. The use of the apparatus above described will not interfere with the use of the conventional sonar equipment normally carried by a submarine, and, further, will not impair the operability of the tracked objects.

It should be understood, of course, that the foregoing disclosure relates only to a preferred embodiment of the invention and that numerous modifications or alterations may be made without departing from the spirit and scope of the invention as set forth in the appended claims.

What is claimed is:

1. Apparatus for tracking underwater objects remote to a vessel comprising:
    transducer means adapted to be carried by the object for transmitting an underwater signal of known signature;
    a plurality of hydrophones for sensing said underwater signal and each providing a hydrophone output signal, said plurality adapted to be carried by the vessel in an underwater array having a first pair of hydrophones spaced from each other in a first direction and having a second pair of hydrophones spaced from each other in a second direction transverse to said first direction;
    signal processing means including a plurality of channels each connected to a respective said pair of hydrophones in said array for receiving said hydrophone output signal thereof, each said channel providing a time differential output signal indicative of the time difference between the respective times of reception of said underwater signal by said hydrophones in said respective pair;
    computer means connected to said signal processing means for receiving said time differential output signals thereof for computing and providing therefrom a computer output signal indicative of the bearing of the object; and
    display means connected to said computer means for receiving said computer output signal and indicating the bearing of the object.

2. Apparatus for tracking underwater objects remote to a vessel comprising:
    transducer means adapted to be carried by the object for transmitting an underwater signal;
    a plurality of hydrophones for sensing said underwater signal and each providing a hydrophone output signal, said plurality adapted to be carried by the vessel in an underwater array having a first pair of hydrophones spaced from each other in a first direction and having a second pair of hydrophones spaced from each other in a second direction transverse to said first direction;
    reference signal generating means for providing a reference signal similar to said underwater signal transmitted by said transducer means;
    a first plurality of modulator means each respective connected to receive one of said hydrophone output signals and said reference signal and providing for each said signal a modulated output signal;
    digital correlation means connected to receive the said modulated output signals for correlating each modulated hydrophone output signal with said modulated reference signal and providing a band-pass correlation function corresponding to each said hydrophone output signal;
    function processing means connected to receive said band-pass correlation functions for providing therefrom for each pair a time differential output signal indicative of the time difference between the respective times of reception of said underwater signal by said hydrophones in said pair;
    computer means synchronized with said transducer means and connected to said signal processing means for receiving said time differential output signals thereof, said computer means being adapted for computing and providing therefrom location output signals indicative of the spherical coordinates of the location of the object; and
    display means connected to said computer means for receiving said location output signals thereof and indicating the location of the object.

3. Apparatus according to claim 2 wherein said function processing means includes:
    a plurality of peak indicating means each connected to said correlation means for receiving a respective said band-pass correlation function and providing a peak output signal when said respective function exceeds a predetermined threshold level;
    clock means providing a clock frequency; and
    counter means connected to said clock means for receiving said clock frequency and connected to two of said peak indicating means which respectively are connected with the hydrophones in one of said pairs for receiving said peak output signals thereof and providing said time differential output signal for said one pair of hydrophones.

4. Apparatus according to claim 2 wherein:
    said reference signal generating means includes a plurality of reference signal generators each generating a Dopplerized reference signal having a respective difference in frequency from that of said underwater signal as transmitted which difference is equivalent to a respective predetermined Doppler shift, each of said predetermined Doppler shifts being within values for a predetermined range of closing velocities between said object and said vessel;

said digital correlation means includes means for correlating each of said Dopplerized reference signals with each of said hydrophone output signals and providing a said plurality of Dopplerized band-pass correlation functions corresponding to each said hydrophone output signal; and said signal processing means further comprises means connected between said correlation means and said function processing means for receiving said Dopplerized band-pass correlation functions and selecting with respect to each hydrophone output signal the Dopplerized band-pass correlation function having the greatest peak above a predetermined threshold level and directing said selected functions to said function processing means.

5. Apparatus according to claim 2 further comprising:

a second plurality of modulator means each connected between said digital correlation means and said function processing means for receiving a respective said function and for providing to said function processing means a correlation function having a center frequency equivalent to that of the hydrophone output signal received by the corresponding one of said first plurality of modulator means.

6. Apparatus according to claim 5 wherein:

said reference signal generating means includes a plurality of reference signal generators each generating a Dopplerized reference signal having a respective difference in frequency from that of said underwater signal as transmitted which difference is equivalent to a respective predetermined Doppler shift, each of said predetermined Doppler shifts being within values for a predetermined range of closing velocities between said object and said vessel;

said digital correlation means includes means for correlating each of said Dopplerized reference signals with each of said hydrophone output signals and providing a said plurality of Dopplerized band-pass correlation functions corresponding to each said hydrophone output signal; and said signal processing means further comprises means connected between said correlation means and said second plurality of modulator means for receiving said Dopplerized band-pass correlation functions and selecting with respect to each hydrophone output signal the Dopplerized band-pass correlation function having the greatest peak above a predetermined threshold level and directing said selected functions to said function processing means.

7. Apparatus comprising:

sensing means for sensing a remotely transmitted pseudo random noise signal and providing an output signal;

first modulator means connected to said sensing means for receiving said output signal and down shifting the center frequency thereof for providing a modulated output signal;

reference signal generating means for providing a reference signal similar to said pseudo random noise signal;

second modulator means connected to said generating means for receiving said reference signal and down shifting the center frequency of said reference signal for providing a modulated reference signal;

digital correlation means connected to said first and second modulator means for receiving and correlating said modulated output signal and said modulated reference signal and providing a band-pass correlation function;

third modulator means connected for receiving said band-pass correlation function for upshifting the center frequency of said function to one equivalent to that of said output signal received by said first modulator means and providing an upshifted band-pass correlation function; and peak indicating means connected to said third modulator means for receiving said upshifted band-pass correlation function and providing a peak output signal when a peak in said upshifted band-pass correlation function above a predetermined threshold level occurs.

8. Apparatus comprising:

first and second sensing means spaced apart, each for sensing a remotely transmitted pseudo random noise signal and providing an output signal;

first and second modulator means connected to said first and second sensing means, each said modulator means being adapted for receiving a respective said output signal and downshifting the center frequency thereof for providing a respective modulated output signal;

reference signal generating means for providing a reference signal similar to said pseudo random noise signal;

third modulator means connected to said generating means for receiving said reference signal and down shifting the center frequency of said reference signal for providing a modulated reference signal;

first and second digital correlation means each connected to said third modulation means and to a respective one of said first and second modulation means for receiving and correlating the respective said modulated output signal and said modulated reference signal for providing a respective band-pass correlation function;

first and second peak indicating means each connected to a respective one of said first and second digital correlation means for receiving said band-pass correlation function thereof and providing a peak output signal when a peak in said band-pass correlation function above a predetermined threshold level occurs;

clock means providing a clock frequency; and counter means connected to said first and second peak indicating means and to said clock means for receiving said peak output signals and said clock frequency and providing a time differential output signal indicative of the time difference between the respective times of reception of said peak output signals.

9. Apparatus according to claim 8 further comprising:

fourth and fifth modulator means each connected between a respective said correlation means and a respective peak indicating means for receiving a respective said band-pass function and upshifting the center frequency thereof for providing an upshifted band-pass correlation function having a center frequency equivalent to that of said respective output signal.

* * * * *